United States Patent [19]

Tisell et al.

[11] 4,015,860
[45] Apr. 5, 1977

[54] VEHICLE SEAT SAFETY HARNESS

[75] Inventors: Claes-Gustav Erik Yngve Tisell, Strangnas; Karl Erik Björn Lundell, Bromma; Sven Henry Nilsson Hörner, Eskilstuna; Gustav Yngve Thorstensson; Gustav Sven Erik Karlstedt, both of Sollentuna, all of Sweden

[73] Assignee: Forenade Fabriksverken, Eskilstuna, Sweden

[22] Filed: Oct. 1, 1975

[21] Appl. No.: 618,486

[30] Foreign Application Priority Data
Oct. 3, 1974 Sweden .......................... 7412471

[52] U.S. Cl. .............................. 280/747; 297/389
[51] Int. Cl.² ........................................ B60R 21/10
[58] Field of Search .................. 280/744, 746, 747; 180/82 C; 297/385, 389

[56] References Cited
UNITED STATES PATENTS

| 3,836,168 | 9/1974 | Nonaka et al. | 180/82 C X |
| 3,838,746 | 10/1974 | Andres | 180/82 C |
| 3,845,836 | 11/1974 | Bendler et al. | 180/82 C |
| 3,871,470 | 3/1975 | Schwanz et al. | 180/82 C |
| 3,871,683 | 3/1975 | Otani | 280/744 |
| 3,901,531 | 8/1975 | Prochazka | 280/746 |

Primary Examiner—Robert R. Song
Assistant Examiner—Michael J. Forman
Attorney, Agent, or Firm—Fleit & Jacobson

[57] ABSTRACT

There is provided an arrangement for tensioning a strap of a vehicle seat safety harness upon or immediately prior to a collision. The arrangement includes strap tensioning means connected to attachment points of the strap adapted to be actuated by a force generating assembly, which assembly is associated with a sensing device responsive to an impact or an imminent impact on the vehicle for initiating the force. Preferably the strap tensioning means comprises two pistons arranged for mutually opposing movement in a common cylinder, each piston being connected via a line to an attachment point whereby actuation of the means effects simultaneous tensioning at the two points.

7 Claims, 5 Drawing Figures

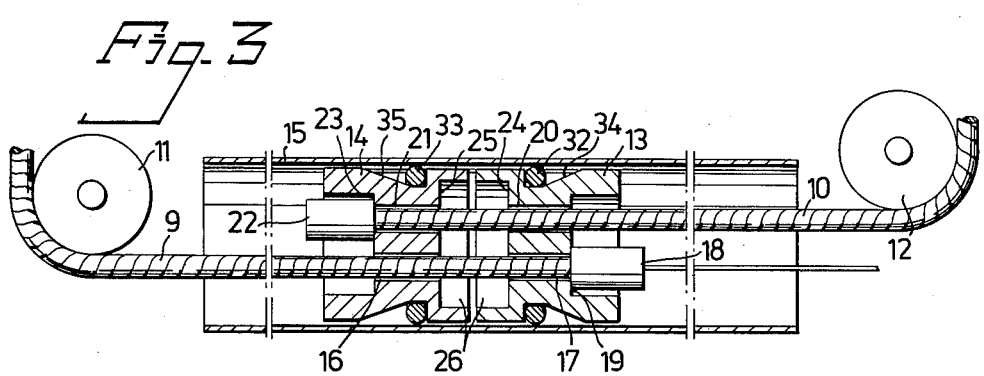
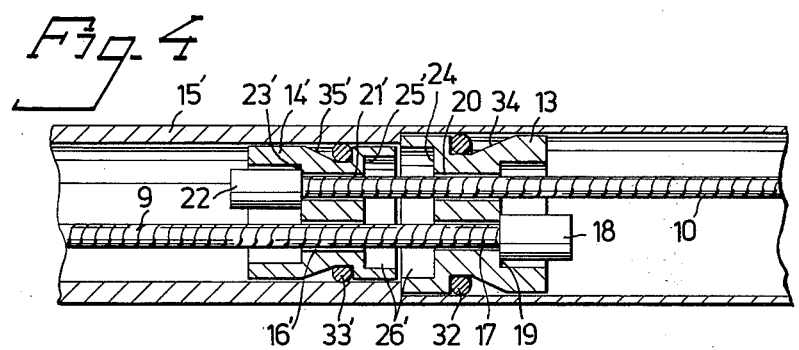
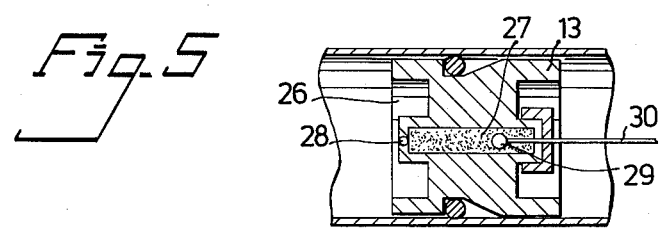

VEHICLE SEAT SAFETY HARNESS

The present invention relates to an arrangement for tensioning or tightening a strap of a vehicle seat safety harness, for example, upon or immediately prior to a collision between said vehicle and another object.

The invention particularly relates, although not exclusively, to an arrangement for tensioning a strap of a safety harness of the three-point suspension type i.e. a safety harness having an upper attachment point and two lower attachment points.

Such three-point suspension harnesses normally comprise a lap strap, which is secured between the two lower attachment points and the upper attachment point. The lap and chest straps are often portions of one single strap, and tensioning of the strap takes place at the upper attachment point or at that lower attachment point which is common to both the lap and chest portions of the strap.

It has been found with such arrangements, however, that the lap portion of the strap is liable to slide up, over the hip bone, so that in the event of a wearer being thrown forward and restrained by the strap, it is the soft regions of the stomach which suffer the strain. Leg injuries may also be incurred as a result of this slipping of the lap strap.

An object of the invention is to provide a safety harness arrangement in which these disadvantages are at least substantially eliminated.

According to this invention a tensioning arrangement for a strap forming part of a vehicle seat safety harness having two attachment points, comprises strap tensioning means adapted to be connected to said strap-attachment points, said strap tensioning means also being adapted to be actuated by means responsive to an impact or an imminent impact on the vehicle to generate a force for effecting said actuation.

Preferably, strap tensioning means connects the strap-attachment points together whereby actuation of the means produces substantially simultaneous tensioning at these points.

By means of such an arrangement, as applied to harness of the three-point suspension type, during the initial tensioning of the strap, the lap portion of said strap can be tensioned harder than the chest portion thereof. In this way, the hips are well supported and restrained, whilst the upper part of the body is allowed to slide slightly forward so as to partially compensate the forward lurching of the head relative to the upper part of the body.

According to a feature of the invention the strap tensioning means comprises a cylinder, two pistons arranged for movement in said cylinder in mutually opposite directions, a chamber between the mutually opposing end faces of said pistons, and two lines attached respectively to each of said pistons and said strap-attachment points.

It will be appreciated that the invention includes within its scope a vehicle seat safety harness incorporating the strap tensioning arrangement and a vehicle fitted with such a safety harness.

In order that the invention may be readily understood and further features made apparent a number of embodiments thereof will now be described, by way of example, shown with reference to the accompanying drawings, in which:

FIG. 3 is a longitudinal sectional view of a first embodiment of a strap tensioning device forming part of the arrangement according to the invention;

FIG. 4 is a longitudinal sectional view of another embodiment of the strap tensioning device forming part of the arrangement according to the invention; and FIG. 5 is a sectional view taken substantially along line 5—5 of FIG. 1 in the direction of the arrows.

Figure 1:
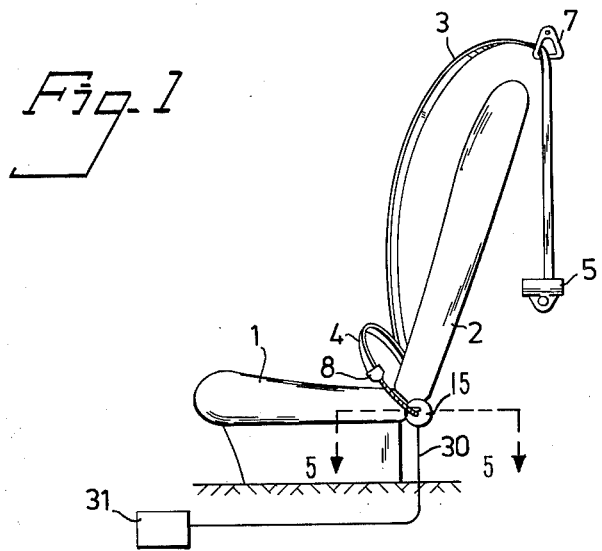
FIG. 1 shows diagrammatically and in side view a front seat of a motor vehicle provided with an arrangement according to the invention.
Figure 2:
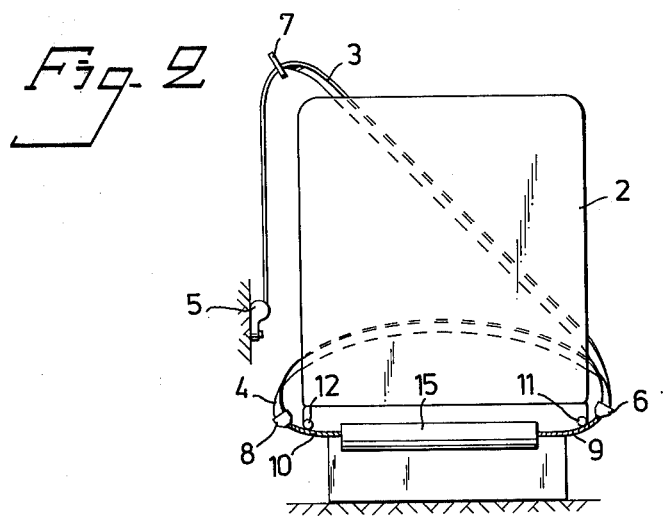
FIG. 2 is a diagrammatic rear view of the arrangement shown in FIG. 1.

FIGS. 1 and 2 show a motor vehicle seat having a seat portion 1 and a back portion 2. Connected to the seat is a safety harness which comprises a diagonal chest strap 3 and a strap 4. In a known manner, one end of the chest strap is secured in a reel 5 attached to a wall of the motor vehicle, said reel forming the upper harness attachment point. The other end of the strap 3 is connected to a plate 6. The strap 3 is also arranged to extend freely through a suspension device 7 which is attached to the vehicle.

One end of the lap strap 4 is connected to the plate 6, whilst the other end of said strap is connected to a further plate 8. The straps 3 and 4 are preferably combined to form a single strap which is slidably connected to the plate 6. The straps 3 and 4, however, may instead be fixed to the plate 6, irrespective of whether they form a single strap or not. By suitable adjustment of the chest strap 3, there is obtained in this way the same tensioning conditions as those obtained when the straps 3 and 4 are slidably connected to the plate 6. Irrespective of whether the straps 3 and 4 form a single strap or remain as two separate straps, the reel 5 constitutes a common upper attachment point therefor. The plates 6 and 8, which form the two lower attachment points for the harness, are each connected to a respective piston 13, 14 (FIG. 3) in a cylinder 15 via a line 9 and 10 respectively and a direction-changing element or guide 11 and 12 respectively, said cylinder preferably having no end walls. The cylinder may be secured to the rear portion of the seat portion for example, although it can also be secured to another point of the vehicle. The cylinder may also be movably suspended, so that it is able to permit force-equalising movements of the cylinder in a manner not shown, for example.

The line 9 extends through an opening 16 in the piston 14 and through an opening 17 in the piston 13 and is provided at one end with a stop member 18 arranged to rest against a shoulder 19 arranged on the end of the piston 13 remote from the piston 14. In a similar manner, the line 10 extends through an opening 20 in the piston 13 and through an opening 21 in the piston 14, and is provided at one end thereof with a stop member 22 arranged to rest against a shoulder 23 arranged on the end of the piston 14 remote from the piston 13. The mutually opposed ends of the pistons 13 and 14 are each provided with a recess 24 and 25 respectively, thereby to form a cylindrical chamber 26 between said pistons.

In the piston 13 (see FIG. 5) there is arranged a cylindrical mass of detonating composition 27 which is in communication with the chamber 26 through a hole 28 in the piston 13. Arranged within the detonating composition 27 is an electrical detonator pellet 29 which, through an electric conductor 30, is connected with a sensing means 31 (see FIG. 1) which is adapted to sense the impact or an imminent impact on the motor vehicle, to cause an electric detonating pulse to be sent to the electric detonator pellet 29. The sensing means 31 may be of the type capable of sensing the impact on the vehicle as the result of a collision and/or capable of detecting whether the vehicle is approaching another object with such a high velocity that a collision is deemed to be unavoidable. Since such sensing means are conventional per se it is not deemed necessary to describe them in further detail.

In their rest position, the pistons 13 and 14 (FIG. 3) are located adjacent each other in the centre portion of the cylinder. When the sensing device 31 generates an electric pulse, the detonator pellet 29 and the detonating composition 27 are initiated, whereupon the pressure of the resulting gas in the chamber 26 moves the pistons 13 and 14 away from each other, whereby there is obtained at the same time tensioning of the strap through the attachment points 6 and 8 of the safety harness.

Each of the pistons 13 and 14 has a slotted ring 32 and 33 respectively arranged in a ring-shaped groove 34 and 35 respectively disposed in the cylindrical surface of the piston, said grooves having a wedge-shaped cross-section. These rings permit the pistons to move freely away from each other, but prevent the pistons from being moved towards each other when the pressure of the gas generated by the detonating composition 27 decreases, owing to the fact that the rings are wedged securely between the grooves 34 and 35 and the wall of the cylinder 15.

In certain cases it may be suitable to have a greater tension force at one lower attachment point than at the other lower attachment point. In this respect, the left-hand piston 14 in FIG. 3 may have a smaller diameter than the right-hand piston 13 and the two halves of the cylinder in which respective pistons move may correspondingly different internal diameters, as shown in FIG. 4. The reference numerals used in FIG. 4 are identical with those used in FIG. 3, with the exception that those elements concerned with the reduced diameter of the left-hand piston have been given a prime.

For resetting the strap tensioning arrangement, for certainty of operation, it is preferred to replace the complete unit, rather than to permit the vehicle owner to reset the position of the pistons 13, 14 and insert a new detonator pellet 29. Accordingly, it is necessary to ensure that minor collisions due to careless parking, manoevering and the like, or hard braking, do not actuate the arrangement, hence the requirement for the sensing device to initiate operation only on impact or an imminent impact.

Although in the illustrated and described embodiments only one of the pistons has been provided with a detonating composition it will readily be perceived that such a detonating composition can be arranged in both pistons.

The invention is not restricted to the described and illustrated embodiments but can be modified within the scope of the following claims. For example, the invention can also be applied to safety harnesses comprising solely a waist belt or comprising two diagonal chest belts each of which is connected to a lower lap belt attachment point.

We claim:

1. An arrangement for tensioning a strap upon or immediately prior to a collision between a vehicle and another object, the strap forming part of a vehicle seat safety harness and having opposite end portions comprising, in combination, strap tensioning means comprising a cylinder, two pistons, having mutually opposing end faces, said two pistons arranged for movement in said cylinder in mutually opposite directions, a chamber between the mutually opposing end faces of said pistons, and two lines attached respectively to each of said pistons and said strap opposite end portions for exerting a substantially simultaneous pulling action on the strap opposite end portions, force generating means for actuating said strap tensioning means thereby drawing the strap tightly against an individual seated in the vehicle seat and sensing means responsive to an impact or an imminent impact on the vehicle for actuating said force generating means.

2. An arrangement according to claim 1, wherein the pistons are provided with means for permitting the pistons to be moved away from each other for tensioning but which prevents the pistons from being moved towards each other.

3. An arrangement according to claim 1, wherein said strap forms part of a harness having an upper attachment point in the vehicle and two lower attachment points, the strap tensioning means being associated with the lower attachment points.

4. An arrangement according to claim 1, wherein said strap is adapted to be attached to two lower attachment points and to be connected with at least one further strap adapted to be attached to a separate or common upper attachment point, the strap tensioning means being associated with the lower attachment points.

5. An arrangement according to claim 1, wherein the force generating means comprises a gas generating substance and means for detonating said substance.

6. An arrangement according to claim 1, wherein the said two pistons have different diameters, and wherein said cylinder includes axial portions associated with each of said pistons and formed with correspondingly different internal diameters.

7. A vehicle harness having two attachment points and including a strap having opposite end portions and a strap tensioning arrangement including strap tensioning means comprising a cylinder, two pistons having mutually opposing end faces, two pistons arranged for movement in said cylinder in mutually opposite directions, a chamber between the mutually opposing end faces of said pistons and two lines attached respectively to each of said pistons and said strap opposite end portions, force generating means for effecting actuation of said strap tensioning means and sensing means responsive to an impact or an imminent impact on the vehicle for activating said force generating means, whereby actuation of the strap tensioning means produces substantially simultaneous tensioning at said two attachment points.

* * * * *